US011425085B1

(12) United States Patent
Farhangi

(10) Patent No.: US 11,425,085 B1
(45) Date of Patent: Aug. 23, 2022

(54) SERVICE DISCOVERY AND RENAMING

(71) Applicant: Amazon Technologies, Inc., Seattle, WA (US)

(72) Inventor: Alireza Farhangi, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 619 days.

(21) Appl. No.: 15/818,686

(22) Filed: Nov. 20, 2017

(51) Int. Cl.
*H04L 61/4511* (2022.01)
*H04L 61/3015* (2022.01)
*H04L 67/55* (2022.01)
*H04L 61/4541* (2022.01)
*G06F 16/951* (2019.01)

(52) U.S. Cl.
CPC ........ *H04L 61/1511* (2013.01); *G06F 16/951* (2019.01); *H04L 61/1541* (2013.01); *H04L 61/3025* (2013.01); *H04L 67/26* (2013.01)

(58) Field of Classification Search
None
See application file for complete search history.

(56) References Cited

U.S. PATENT DOCUMENTS

| 7,721,279 | B1 | 5/2010 | Caufield et al. | |
|---|---|---|---|---|
| 8,924,542 | B1* | 12/2014 | Gabrielson | H04L 12/4641 709/224 |
| 2004/0068731 | A1* | 4/2004 | Davis | G06F 9/4868 719/310 |
| 2005/0203875 | A1* | 9/2005 | Mohammed | H04L 61/302 |
| 2008/0288492 | A1* | 11/2008 | Gemmell | G06F 16/9562 |
| 2009/0037896 | A1* | 2/2009 | Grechanik | G06F 8/65 717/168 |
| 2009/0055929 | A1* | 2/2009 | Lee | H04L 29/12066 726/23 |
| 2012/0030274 | A1* | 2/2012 | Christenson | G06F 16/162 709/203 |
| 2012/0109905 | A1* | 5/2012 | Tingstrom | G06F 17/227 707/690 |
| 2013/0173497 | A1* | 7/2013 | Gould | H04L 61/302 705/400 |

(Continued)

OTHER PUBLICATIONS

Chris, Tracking Internal Redirects in Analytics and Tracing External Redirects, May 7, 2015 (Year: 2015).*

*Primary Examiner* — Lance Leonard Barry
*Assistant Examiner* — Mohammad Yousuf A. Mian
(74) *Attorney, Agent, or Firm* — Robert C. Kowert; Kowert, Hood, Munyon, Rankin & Goetzel, P.C.

(57) ABSTRACT

A provider network implements service discovery and renaming. A provider network includes a domain name service (DNS) and a renaming tool. The DNS receives queries for service names and sends query logs to a data store. Each query log indicates the queried name and a network address (e.g., IP address). A user may request that the service be renamed to a new name. In response, the renaming tool adds a new entry to for the new name to the DNS. The renaming tool retrieves data from the query logs and identifies clients of the service. The renaming tool sends a notification to the identified clients that the name has changed to the new name. The renaming manger retrieves additional data from the query logs to identify how many of the clients have switched to using the new name. After enough clients have switched, the old name may be decommissioned.

20 Claims, 11 Drawing Sheets

(56) References Cited

U.S. PATENT DOCUMENTS

2014/0215628 A1* 7/2014 Yan .................... H04L 61/1511
  726/25
2014/0237087 A1  8/2014 Elias et al.
2018/0176241 A1* 6/2018 Manadhata ............ H04L 67/10

* cited by examiner

*Top Five Clients Making Requests for Old Name of Service*

SERVICE DISCOVERY AND RENAMING

BACKGROUND

With the increased availability of internet connectivity and remote services that are available by remote service providers over the internet, many client organizations have hundreds or thousands of devices and applications that are clients of remote services. Some service providers have broken up large services into separate smaller services (e.g., "micro services") to allow more granular control over functionality. Moreover, using many smaller services allow for more granular control over different scaling and latency requirements that may not be achievable when using one large service.

For various reasons, an organization may wish to change the name of a particular service. For example, an organization may have thousands of clients that make requests to a service named "name.foo.com," but the name for the service may need to be changed to "newname.foo.com." The organization may be unable to update the service name as well as every client all at once, particularly when there are thousands of clients of the service in various locations. In many cases, the organization may be unable to identify all clients that are using the service or may be unable identify them in a relatively short amount of time. Therefore, when a service changes names, numerous clients may experience service outages. This may cause applications to fail and cause various systems to break due to dependencies on the service.

Figure 1:
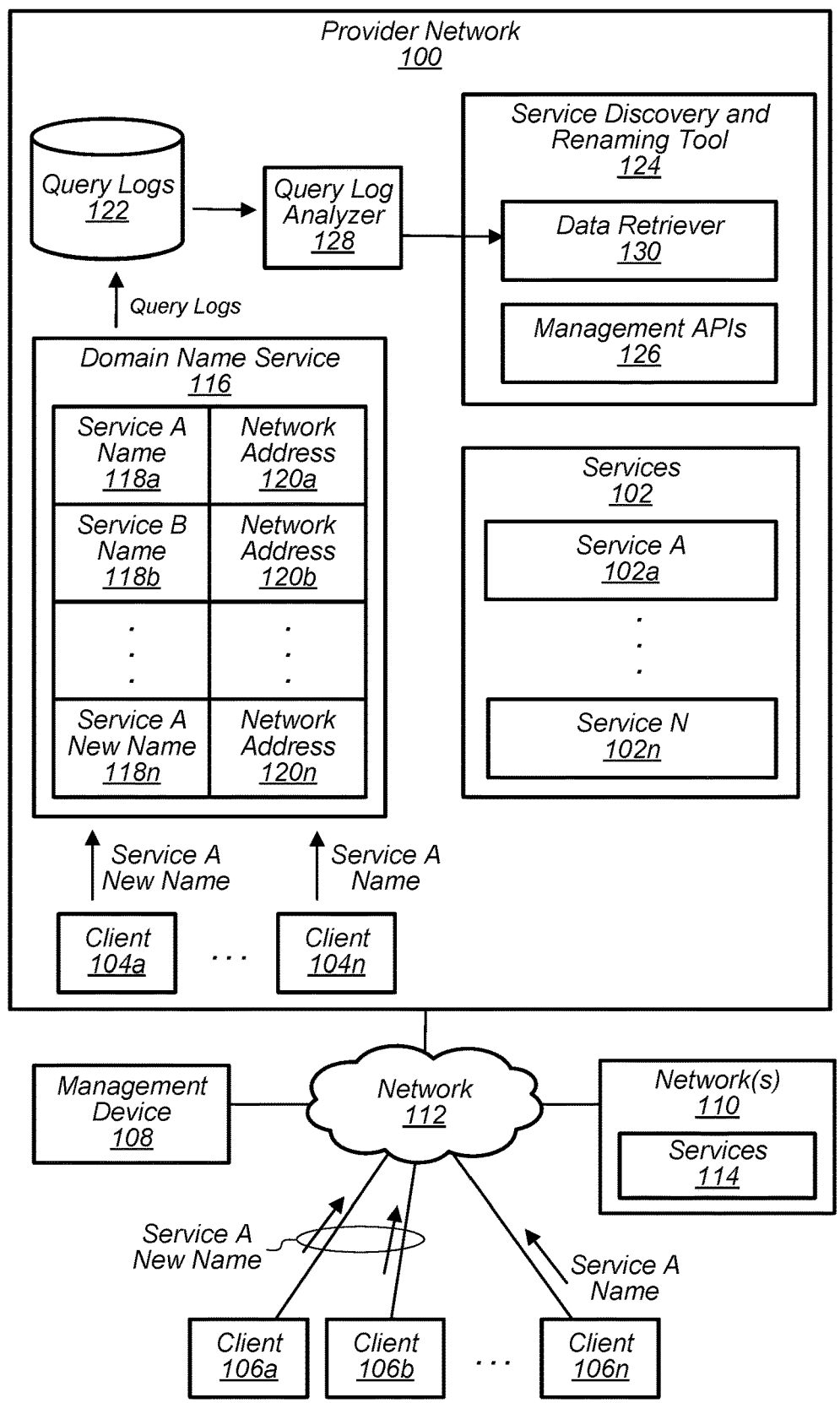
FIG. 1 illustrates a system for service discovery and renaming, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement service discovery and renaming of services. In embodiments, a provider network includes a domain name service that receives queries for names. The domain name service generates a query log for each received query. In embodiments, a query log may include a queried name (e.g., identifying a service) and a network address of a client that originally submitted a request for the queried name. For example, a remote client device may submit a network protocol message such as a hyper-text transport protocol (HTTP) request that includes a name identifying the service. In embodiments, the domain name service sends the query logs to a data store of the provider network (e.g., a storage device of a data storage service).

In embodiments, the provider network includes a service discovery and renaming tool ("renaming tool"). The renaming tool may perform various tasks related to renaming one or more services. For example, the renaming tool may instruct the domain name service to add a new entry for a new name of a particular service. The entry may include the new name (e.g., newname.foo.com) and a network address for the service (e.g., internet protocol (IP) address). In embodiments, the entry may also include a port number and/or other parameters associated with the service.

In some embodiments, the renaming tool may also determine clients of the service and/or clients that have used the service within at least a threshold period of time (e.g., within the past day or week). To do so, the renaming tool may first retrieve data from the query logs. For example, the renaming tool may retrieve data from query logs that indicate or include the name of the service as the queried name. The renaming tool may then analyze the retrieved data and identify the clients of the service based on the analysis. In embodiments, the renaming tool may then send a name change notification to the identified clients (or at least a portion of the clients that are able to receive the notifications). The notification may indicate that the name of the service has changed to the new name.

In embodiments, at a point in time after the name change notification is sent to the identified clients, the renaming may retrieve additional data from additional query logs that were generated by the domain name service and stored to the data store. The renaming tool may analyze the additional data and identify clients that are continuing to use the old name of the service and/or clients that have switched to using the new name of the service.

In some embodiments, the renaming manger determines whether to delete the entry for the old name of the service from the domain name service. For example, the renaming manger may instruct the domain name service to delete the entry for the old name of the service when a majority of the clients (e.g., 99%) have switched to using the new name of the service. In some embodiments, the renaming manager may instead send data to a management device (e.g., to a user interface) that indicates how many of the clients have switched to using the new name of the service. The renaming tool may then receive a request from the management device to decommission the old name (e.g., delete the entry for the old name).

By implementing service discovery and renaming of services as described herein, various embodiments may allow a client entity (e.g., a company or other organization) with many client devices that use a service to avoid outages when changing the name of the service (e.g., changing oldname.foo.com to newname.foo.com). Using traditional techniques, changing the name of service causes many outages and/or breaks because many of the clients of the service to continue to send requests to the old service name, which no longer exists in a domain name service and/or name server.

Using techniques described herein, a client entity may minimize or eliminate outages that result from name changes. Moreover, a client entity may have more control over the renaming process. For example, a renaming tool may provide information to a user (e.g., via a user interface of a management device) that indicates how many of the clients have transitioned from using the old name of the service to using the new name. The user may then decide whether to have the renaming tool decommission the old name. For example, the user may indicated, via a user interface, to decommission the old name. In some embodiments, the renaming tool may automatically decommission the old name based on one or more rules (e.g., decommission the old name if less than 1% of clients are still using the old name). In embodiments, some or all of the rules may be provided to the renaming tool by the client entity (e.g., via a management device).

In some embodiments, a "network address" may refer to an IP address or another identifier suitable to be used for identifying an endpoint to transmit data to or suitable to identify an endpoint that data is received from. In embodiments, an "endpoint" may by a computing device and/or a service that is part of a local network or a remote network, such that information may be transmitted to or from the endpoint via one or more network connections. In some embodiments, an endpoint may be identified by a network address. In embodiments, a "user" may be an end user and/or service owner (e.g., a system administrator) that provides input to the provider network via a management device (e.g., via a graphical user interface of a display of a computing device).

FIG. 1 illustrates a system for service discovery and renaming, according to some embodiments. As depicted, a provider network 100 provides one or more services 102 to one or more internal clients 104 and/or one or more external clients 106. Although certain components of the provider network 100 are described as performing various actions, any of the actions described as performed by the provider network 100 may be performed by any particular component of the provider network 102, a management device 108, clients 104, 106, or any components of the networks in FIG. 1 or 2.

In the depicted embodiment, the provider network 102 is connected to the management device 108, clients 106, and one or more other remote networks 110 via a wide area network 112 (e.g., the Internet). In embodiments, any of the clients 104, 106 may use one or more services 114 of the one or more networks 110 instead of or in addition to one or more of the services 102 of the provider network 100.

As shown, the provider network 100 includes a domain name service (DNS) 116 that provides lookup services to route requests to respective resources. In embodiments, the DNS 116 includes one or more name servers and may include any other number of software and/or hardware components to provide lookup and routing services for DNS queries for names (e.g., names of services included in requests originating from clients 104, 106). In embodiments, the queried name may be a domain (e.g., foo.com), a subdomain (e.g., nameA.foo.com), or a name in any other suitable format.

In the example embodiment, the DNS 116 stores any number of entries for names of services and corresponding network addresses for the services. Each entry may include any other information corresponding to each service or network address (e.g., port number). For example, the DNS 116 stores service A name 118a (e.g., serviceA.foo.com) and the corresponding network address 120a, service B name 118b (e.g., serviceB.foo.com) and the corresponding network address 120b, and service A new name 118n (e.g., serviceAnewname.foo.com) and the corresponding network address 120n. The above information for each service or network address may be stored in any suitable format or data structure (e.g., table, list, etc.).

In embodiments, the DNS 116 logs each DNS query and sends them to a query logs 122 data store. For example, when the DNS 116 receives a query for a name, the DNS may generate a query log that includes information about the query, including one or more of the queried name (e.g., name.foo.com), the network address or partial network address of the client that the request originated from, a timestamp of when the query was received, a format for the query log, a host ID for a server that received the request, a type of query received, a response code that was returned in response to the query, the protocol used to submit the query (e.g., transport control protocol (TCP) or user datagram protocol (UDP), an edge location (e.g., server location) that responded to the query, and the network address of the domain name system resolver that submitted the request to the DNS 116. In embodiments, any other suitable information associated with the query may be included in the query log.

In the depicted embodiment, the provider network includes a service discovery and renaming tool ("renaming tool" 124). The renaming tool 124 may implement and coordinate tasks for renaming a service in order to prevent or minimize outages that may otherwise occur when renaming the service. As described below, the workflow for renaming a service may be automated or may include one or more manual portions (e.g., requiring input from a user for one or more tasks).

In an example embodiment, an entity with many clients (e.g., client devices and/or applications) that use a particular service (e.g., service A name 118a) may decide to change the name of a service to a new name (e.g., service A new name 118n). To do so, a user may first submit a request to the renaming tool 124 to change the name. For example, the user may enter the request via a user interface of a management device 108. In embodiments, the renaming manger 124 includes management application programming interfaces (APIs) 126 that allow the renaming tool 124 to communicate with the management device. For example, the APIs may send data for display to the user or the APIs may receive commands or requests from the user to perform tasks.

In response to receiving the renaming request, the renaming tool 124 may add a new entry for the new name. For example, the renaming tool 124 may instruct the DNS 116 to add a new entry for the new name, providing the information to include in the entry. As shown, the entry includes service A new name 118*n* and network address 120*n*. In embodiments, the renaming tool 124 may clone some or all of the information (e.g., network address, port, etc.) from the other entry that includes the original name, and provide the cloned information to create the new entry for the service. Thus, the network address 120*n* may be the same as the network address 120*a*. As discussed below, in some embodiments, a different network address may be used.

In some embodiments, the provider network 100 includes a query log analyzer 128. In one embodiment, the renaming manger 124 may include the query log analyzer 128 or implement at least some of the functionality of the query log analyzer 128. The query log analyzer may obtain at least some of the query logs 122 (or raw data from the query logs), analyze the data of the obtained query logs, and store results of the analysis. In embodiments, the analysis may include modifying and/or filtering data and/or aggregating data. The results may provide various insights based on the analysis.

In embodiments, the renaming tool includes a data retriever 130 that retrieves data from the query log analyzer 128 and/or query logs 122. In embodiments, the data retrieved by the data retriever may be data from one or more query logs that is stored in the query logs 122 or data generated and/or stored by the query log analyzer 128. The data retriever may retrieve data from the query log analyzer and/or query logs 122. The renaming tool 124 may inspect or analyze the retrieved data in order to determine which clients use the service or have used the service within a period of time (e.g., within the past week).

In some embodiments, the renaming tool (e.g., data retriever 130) may search the query logs 122 or query log data generated and/or stored by the query log analyzer for query logs and/or data that includes the service as the queried name, and then retrieve those query logs and/or query log data. The renaming tool may then identify the client that originally submitted the request for the service based on the retrieved query logs and/or query log data. For example, the renaming tool may identify the network address or partial network address of the client that the request originated from.

In some embodiments, the renaming tool may only retrieve data for query logs that occurred within a time period based on a timestamp (e.g., queries received during the past week) and/or only retrieve data for a maximum number of query logs. A user may specify any of the above information via a user interface and/or management device to cause the renaming tool to only retrieve certain data from the query logs 122 and/or the query log analyzer 128. After the renaming tool identifies the clients of the service based on the analysis of the retrieved data and/or query logs, the renaming tool may notify some or all of the clients that the name of the service has changed to service A new name 118*n*.

In some embodiments, the renaming tool may send a name change notification message to the clients by using the network address from the query logs as the destination network address. In embodiments, the renaming tool may send data to the management device that identifies some or all of the clients. A user may then send name change notifications to some or all of the clients. Some of the clients may not be capable of receiving the name change notification and/or reconfiguring to use the new name. For example, some clients may be "hard-coded" to use the original name of the service when making requests to the service. Thus, the user may need to manually reconfigure those clients to user the new name.

As shown, after a certain amount of time, some of the clients begin to make calls to the service using the new name "service A new name." For example, clients 104*a*, 106*a*, and 106*b* have submitted requests for "service A new name." The requests are routed to the DNS 116, which looks up the entry for the new name and identifies the network address 120*n* to route the request. However, clients 104*n* and 106*n* are continuing to submit requests for the original name "service A name." Thus, not all of the clients have been updated to make service requests using the new name. As described below, actions may be taken to determine when the original name of a service may be decommissioned (e.g., removed from the DNS 116).

Figure 2:
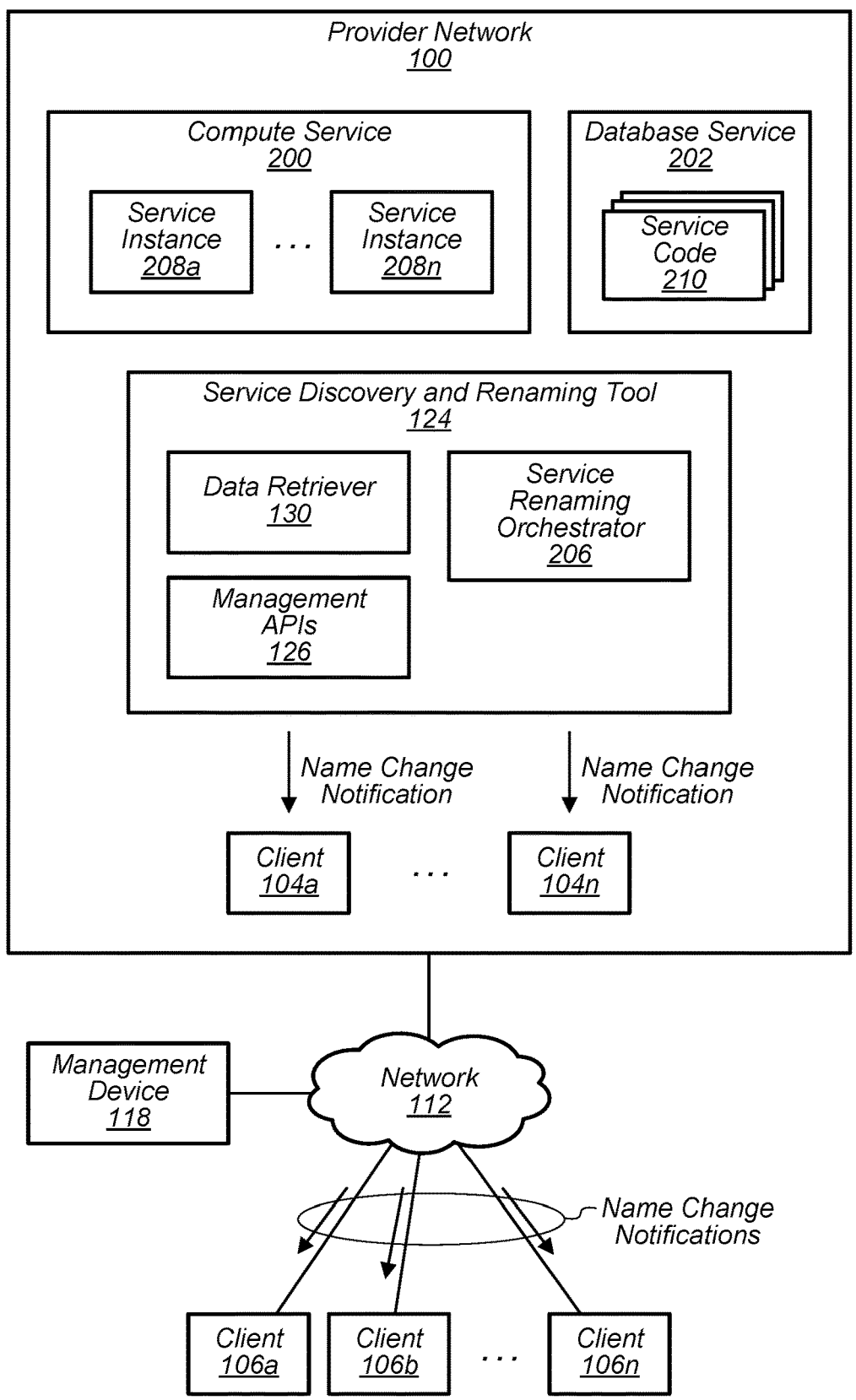
FIG. 2 illustrates a system for service discovery and renaming, according to some embodiments.

FIG. 2 illustrates a system for service discovery and renaming, according to some embodiments. As shown, the provider network 100 includes the renaming tool 124, a compute service 200, a database service 202, and clients 104. Although not shown, the provider network 100 also includes the DNS 116, query logs 122, and services 102.

In the depicted embodiment, the renaming tool 124 also includes a data retriever 130 and a service renaming orchestrator 206. In embodiments, the data retriever 130 searches the query logs 122 or query-based data of the query log analyzer 128 to identify query logs and/or data that indicate requests for a particular service (e.g., service A new name 118*n*) and retrieves the identified data from identified logs and/or data. In some embodiments, the data retriever 130 retrieves the entire query log or the data stored in the entire log. In embodiments, the data retriever 130 retrieves one or more of the data items discussed above (e.g., queried name, the network address or partial network address of the client that the request originated from, a timestamp of when the query was received) that corresponds to one or more query logs (e.g., stored by the query log analyzer or in query logs).

The service renaming orchestrator 206 may coordinate the process or workflow for renaming a service. In embodiments, the service renaming orchestrator 206 may instruct the DNS 116 to add and delete entries for services. For example, the service renaming orchestrator 206 may determine, based evaluating one or more rules, to instruct the DNS 116 to add an entry for a new name of a service and/or remove an entry for an old name of a service.

In the example embodiment, the service renaming orchestrator 206 sends name change notifications to the clients 104, 106 of a particular service. For example, the name change notifications may indicate (e.g., via a network protocol message) that the name of a particular service has changed from service A name 118*a* to service A new name 118*n*. In response to determining that the name has changed, the service renaming orchestrator 206 may send the name change notification to each of the clients of the particular service (e.g., in response to instructing the DNS 116 to add the entry for the new name and/or taking any other actions associated with changing the name of the service).

In some embodiments, the service renaming orchestrator 206 may send a name change notification to one or more clients in response to being polled for a name change by the one or more respective clients. For example, a particular client may poll the service renaming orchestrator 206 at intervals (or asynchronously) to check the name change status for the service. If the service renaming orchestrator 206 determines the name has changed, then the service renaming orchestrator 206 sends the name change notification to the particular client in response to being polled by the particular device (e.g., a message including the new name of the service). If the service renaming orchestrator 206 determines the name has not changed, then the service renaming orchestrator 206 takes no action in response to being polled by the device (or the service renaming orchestrator 206 instead sends a notification to the particular client that the name has not changed).

In various embodiments, the service renaming orchestrator 206 may send name change notifications to clients of a particular service according to a notification schedule. In embodiments, the schedule may be defined by a user. For example, the identified clients of the particular service may be grouped into two or more different groups (e.g., user-defined). Then, the service renaming orchestrator 206 may send a name change notification to the clients of one group at a time, waiting for a period of time (e.g., user-defined) in between each round of notifications. For example, the service renaming orchestrator 206 may identify 1000 clients and group the clients into five groups of 200. In response to determining that the name has changed, the service renaming orchestrator 206 may send a notification to 200 clients of one group, wait for a period of time, send the notification to 200 clients of another group, wait for a period of time, etc. until all clients are notified. In some embodiments, the service renaming orchestrator 206 may send name change notifications according to a percentage schedule (e.g., user-defined). For example, in response to determining that the name has changed, the service renaming orchestrator 206 may send a notification to 10% of the clients, wait for a period of time, send the notification to another 10% of the clients, wait for a period of time, etc. until all clients are notified.

In embodiments, a user may wish to know how many of the clients have switched to using the new name and/or how many clients have continued to use the old name. The user may request the above information via a user interface and the management APIs. In response, the service renaming orchestrator 206 may retrieve additional query logs for the new name and the old name. In embodiments, the service renaming orchestrator 206 may retrieve query logs for queries that have been received over a recent time period (e.g., the last 12 hours) or query logs for queries that have been received since a particular point in time (e.g., since 2 pm).

Figure 8:
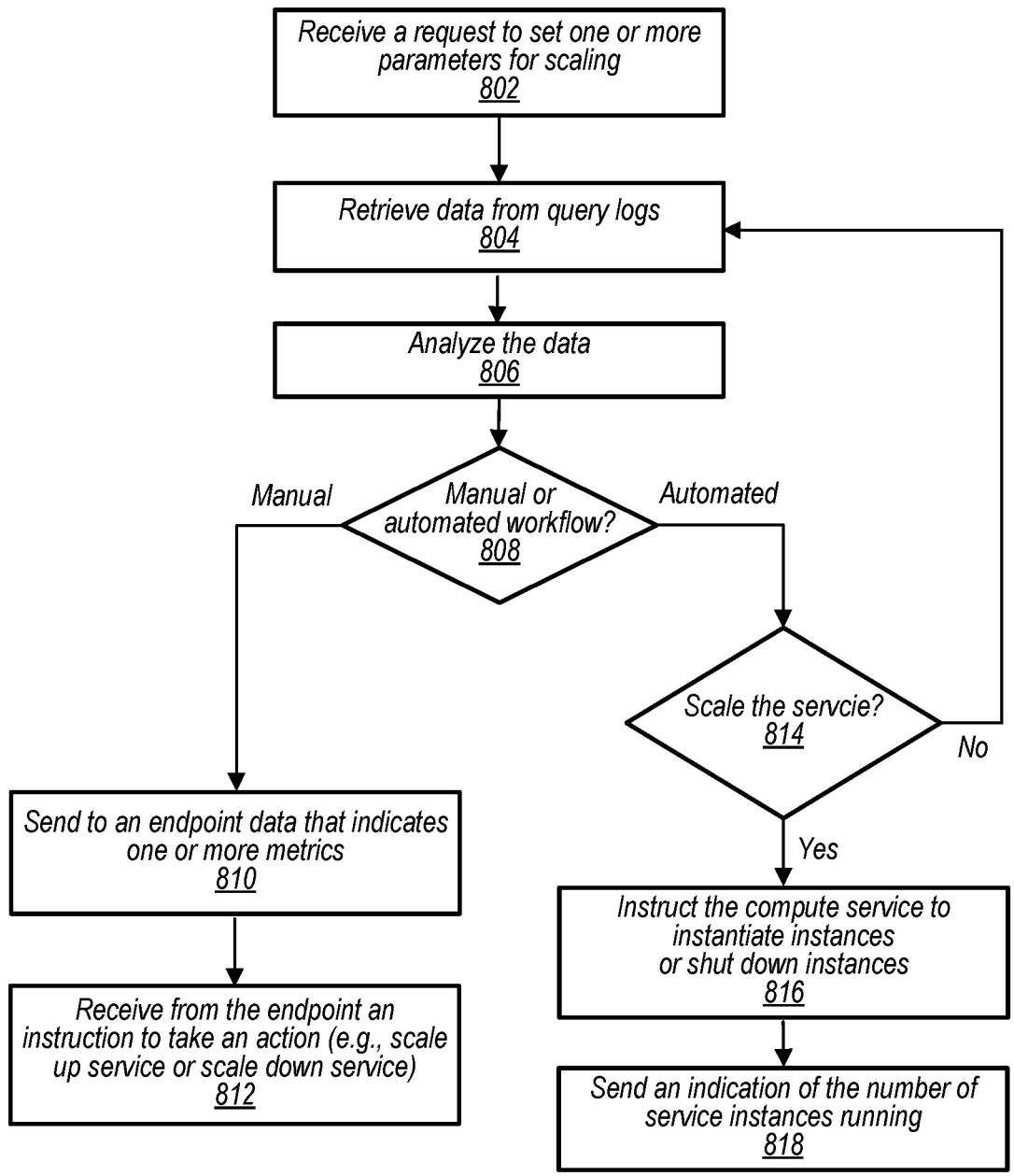
FIG. 8 is a flow diagram illustrating analyzing data based on query logs and following a manual or automated workflow for taking subsequent actions for scaling service instances up or down, according to some embodiments
Figure 9:
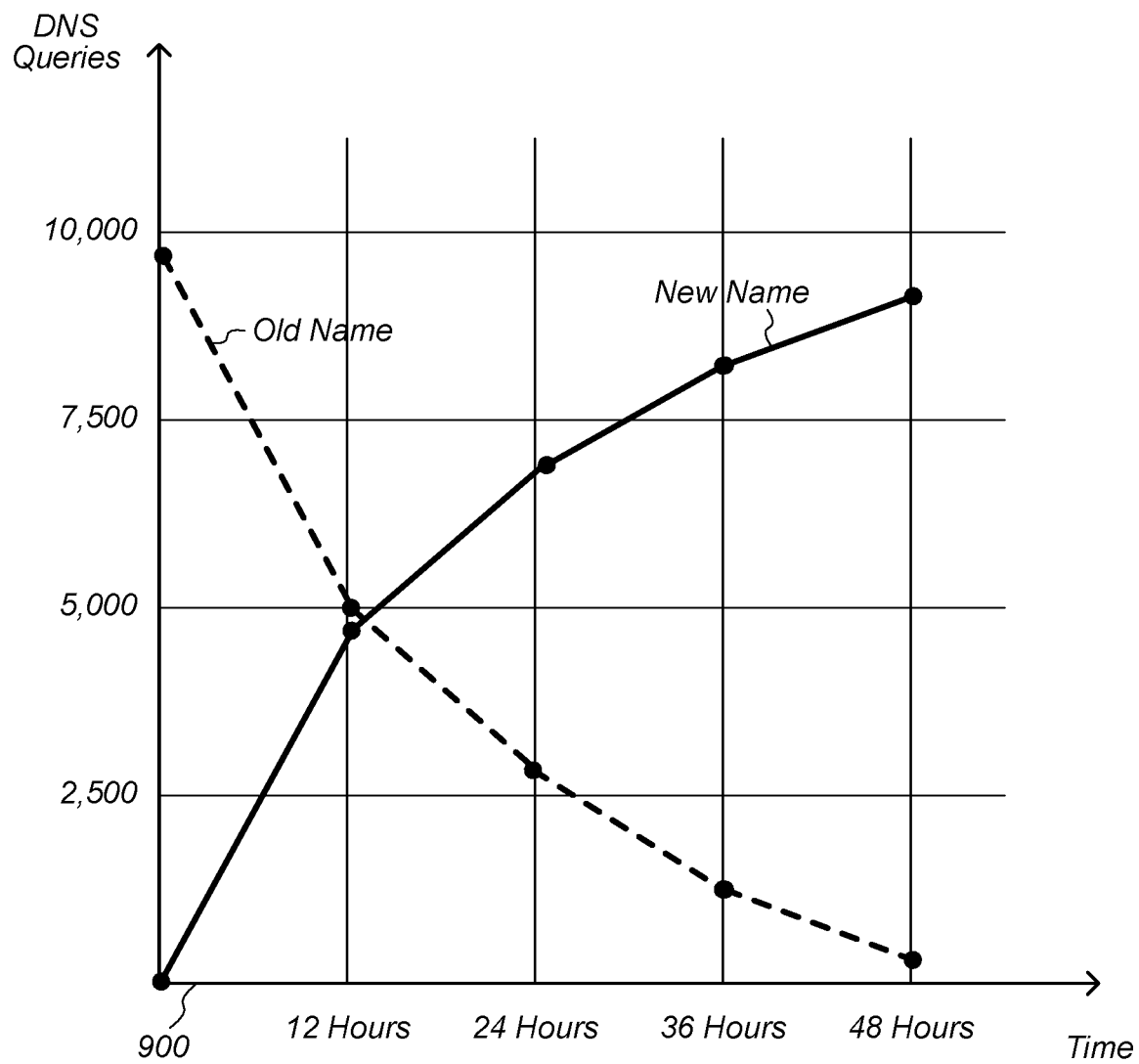
FIG. 9 illustrates an example display of data indicating queries made for an old service versus a new service.

The service renaming orchestrator 206 may determine, based on client-identifying information of the query logs (e.g., network address of clients that the request originated from), how many of the clients have switched to using the new name and/or how many of the clients have continued to use the old name. The service renaming orchestrator 206 may then send the information to the user via the management APIs and the user interface of a management device. For example, the information may be displayed in the form of a graph or table, as depicted in FIGS. 8 and 9.

The user may then decide to take one or more actions based on the information. For example, the user may send a request to the service renaming orchestrator 206 to decommission the old name. If so, then the service renaming orchestrator 206 may instruct the DNS to remove the entry for the old name of the service. The user may instead decide to resend the name change notification to the clients and send a request for the service renaming orchestrator 206 to do so. In some cases, the user may decide to have the service renaming orchestrator 206 retrieve and analyze additional data from more recent query logs to see if any more clients have recently switched and send a request for the service renaming orchestrator 206 to do so. As described below, the service renaming orchestrator 206 may perform one or more tasks automatically.

In embodiments, before or after the service renaming orchestrator 206 instructs the DNS to remove the entry for the old name of the service, the service renaming orchestrator 206 may store the old name and some or all of the data from the entry for the old name to provide a rollback option to restore the old entry to the DNS. For example, if something goes wrong with the renaming process (e.g., one or more clients break or generate errors due to the renaming of the service), then a user may manually restore (e.g., via an "undo" button or other displayed element on a graphical user interface of a client management device) the DNS to a previous state or a last known good state (e.g., a state before renaming one or more of the services).

Thus, in embodiments, a user may roll back name changes by removing one or more recently added entries in the DNS and restoring one or more old names. In embodiments, the renaming service may store the old names and/or corresponding entry data in a change log that records some or all of the changes made to the DNS. When a user requests a rollback, the user may request a rollback to a certain point in time or to a certain name change, in which case the renaming tool makes one or more changes to the DNS to restore the DNS to the state corresponding to the point in time or to just before the name change. In some embodiments, instead of deleting an entry for an old name from the DNS, the renaming manger may instruct the DNS to mark or flag the old name entry to indicate it as an inactive entry. During rollback to the old name, the old name entry may be re-activated. In embodiments, if the old name entry is not re-activated (or restored) for a certain time period after being inactivated (e.g., 1 week), then the renaming manger deletes and/or removes it from the DNS (or removes it from another storage location).

In some embodiments, when a particular service is renamed, the service renaming orchestrator 206 may instruct a compute service 200 to instantiate a new service instance 208 to provide the service (e.g., to deploy a new version of code for the service in the new service instance). For example, when the service is renamed to service A new name 118*n*, the compute service 200 may instantiate service instance 208*n* to provide the functionality of the service (e.g., receive requests, perform computations, send responses, etc.). In embodiments, service code 210 may be sent from the database service or other source to the compute service and loaded into the service instance as part of instantiating the service instance. In embodiments, the code may be loaded after the service instance is instantiated. The service instance may include an execution environment running on one or more computing devices (e.g., servers) that is configured to execute the service code.

When a new service is instantiated for service A new name 118*n*, the service renaming orchestrator 206 may instruct the DNS to include a different network address for the entry for the new name. The different network address is for the new service instance. A user may wish to do this when there is new code for the service (e.g., a new version of code and/or new functionality provided by new code). In embodiments, the new version of code may be more efficient and faster. Thus, the user may upgrade the service as part of the renaming process. For various reasons as discussed above, at a certain point the original name service A name 118a may be removed from the DNS and the service instance corresponding to service A name may be shut down. This may free up system resources (e.g., memory, data storage, etc.) so they are available for other new instances. Thus, in various embodiments, a service may be renamed due to a name change itself (with no changes in code) or may be renamed due to changes in the code (e.g., renaming from "frontend.version1.myservice.local" to "frontend.version2.myservice.local").

In some cases, a user may wish to rename the service to create additional locations (e.g., geographic locations) from which the service can be implemented. For example, a service that is being provided by a service instance at an east coast location may be also be provided by a new service instance at a west coast location by instantiating a new service instance at a server at the west coast area. Thus, a user may rename a service from name.foo.com to two new names—east.foo.com and west.foo.com to deploy the service to two different locations. Clients that were previously using name.foo.com would then begin to use either east-.foo.com or west.foo.com.

The above techniques may be used to create any additional number of new names and corresponding service instances, which may allow a service load to be distributed among different geographic locations while eliminating or minimizing outages caused by the renaming and redistributing process. For various reasons as discussed above, at a certain point the original name name.foo.com may be removed from the DNS and the service instance corresponding to name.foo.com may be shut down. This may free up system resources (e.g., memory, data storage, etc.) so they are available for other new instances.

Figure 3:
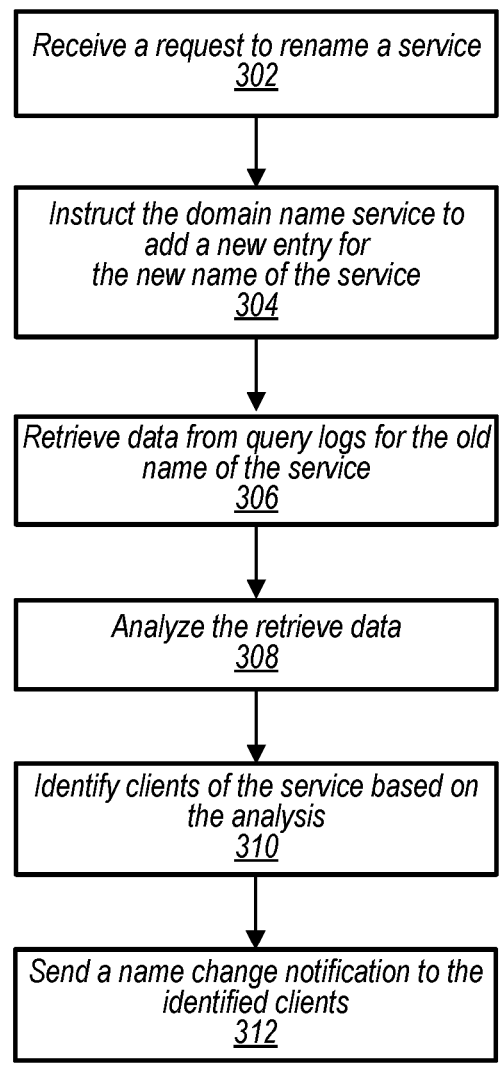
FIG. 3 is a flow diagram illustrating identification of clients of a service and sending a name change notification to the identified clients, according to some embodiments.

FIG. 3 is a flow diagram illustrating identification of clients of a service and sending a name change notification to the identified clients, according to some embodiments. One or more portions of the illustrated processes of FIGS. 3-7 may be performed by any particular component of the provider network 100, a management device 108, clients 104, 106, or any components of the networks in FIG. 1 or 2.

At block 302, a renaming manger receives a request to rename a service. At block 304, the renaming tool instructs the DNS to add a new entry for the new name of the service. The new entry may include at least the new name of the service and a corresponding network address (e.g., network address of the service instance for the service).

At block 306, the renaming manger retrieves data from one or more query logs. Each of the query logs may include the old name of the service as the query name. At block 308, the renaming tool analyzes the retrieved data. At block 310, the renaming tool identifies clients of the service based on the analysis. In some embodiments, the renaming tool may identify the originating client network address from a query log as belonging to a particular client or client ID or may use the originating client network address as a unique ID for the client.

At block 312, the renaming tool may send to the identified clients a notification that the name of the service has changed to the new name. In some embodiments, the renaming tool may send the notification to only a portion of the identified clients. For example, some of the clients may not be reachable for various reasons, may be incapable of receiving name change notifications, and/or may be hard-coded with the original service name.

Figure 4:
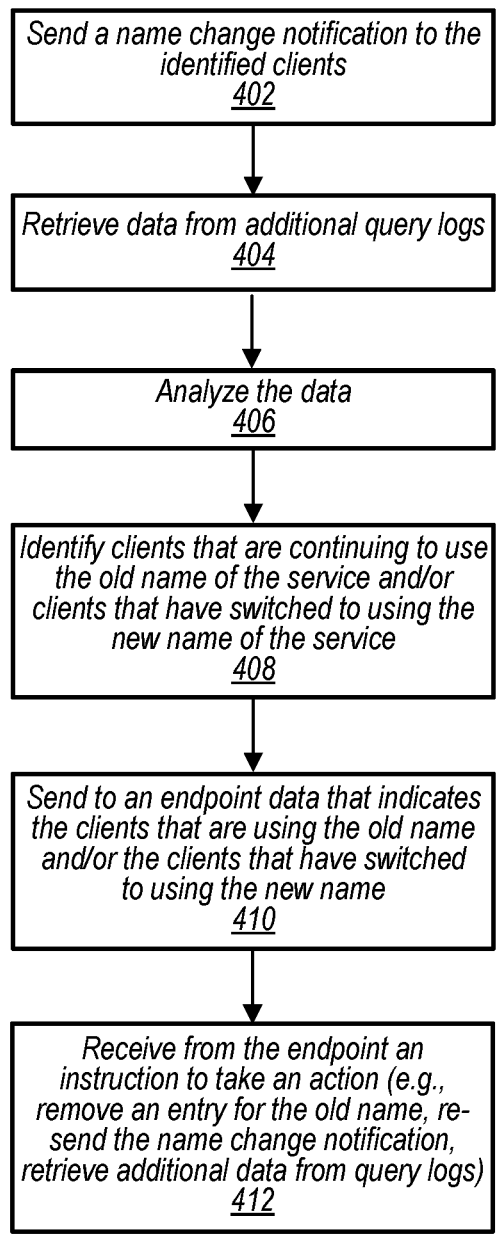
FIG. 4 is a flow diagram illustrating identifying clients that are using the old name or have switched to using the new name and receiving an instruction to take an action, according to some embodiments.

FIG. 4 is a flow diagram illustrating identifying clients that are using the old name or have switched to using the new name and receiving an instruction to take an action, according to some embodiments. At block 402, the renaming tool sends a name change notification to identified clients.

At block 404, the renaming tool retrieves additional data from one or more additional query logs. In embodiments, the renaming tool may wait for a predetermined amount of time before retrieving the additional data. At least some of the additional query logs may include the new name of the service as the queried name. At least some of the additional query logs may include the old name of the service as the queried name. Thus, the renaming tool may retrieve data from any records that include the old name or the new name.

At block 406, the renaming tool analyzes the retrieved data. At block 408, the renaming tool identifies clients that are continuing to use the name of the service (e.g., using the originating client network address of query logs that include the old name) and/or clients that have switched to using the new name of the service (e.g., using the originating client network address of query logs that include the old name).

At block 410, the renaming tool sends to an endpoint (e.g., management device) data that indicates clients that are using the old name and/or clients that have switched to using the new name. In embodiments, the data may include one or more of the clients that are continuing to use the name, a number of queries for the name, a number of queries for the name that originated from the respective one or more of the clients that are continuing to use the name, one or more of the clients that have switched to using the other name, a number of queries for the other name, and a number of queries for the other name that originated from the respective one or more of the clients that have switched to using the other name. FIGS. 8 and 9 show examples of graphical representations of the data that may be displayed on a graphical user interface of a management device.

At block 412, the renaming tool receives from the endpoint (e.g., management device) a request or instruction to take an action. For example, the request may be to decommission the name of the service. If so, then the renaming tool instructs the DNS to delete (or inactive) the entry for the old (e.g., original) name.

In some cases, the request may be to continue analyzing data from query logs to identify additional clients that are continuing to use the name of the service or that have switched to using the other name of the service. The request may specify a period of time to do so, after which the renaming tool is to send to the endpoint (e.g., management device) additional data that indicates clients that are using the old name and/or clients that have switched to using the new name (which may indicate more clients have switched). In some cases, the request may be to resend the name change notification to the clients.

Figure 5:
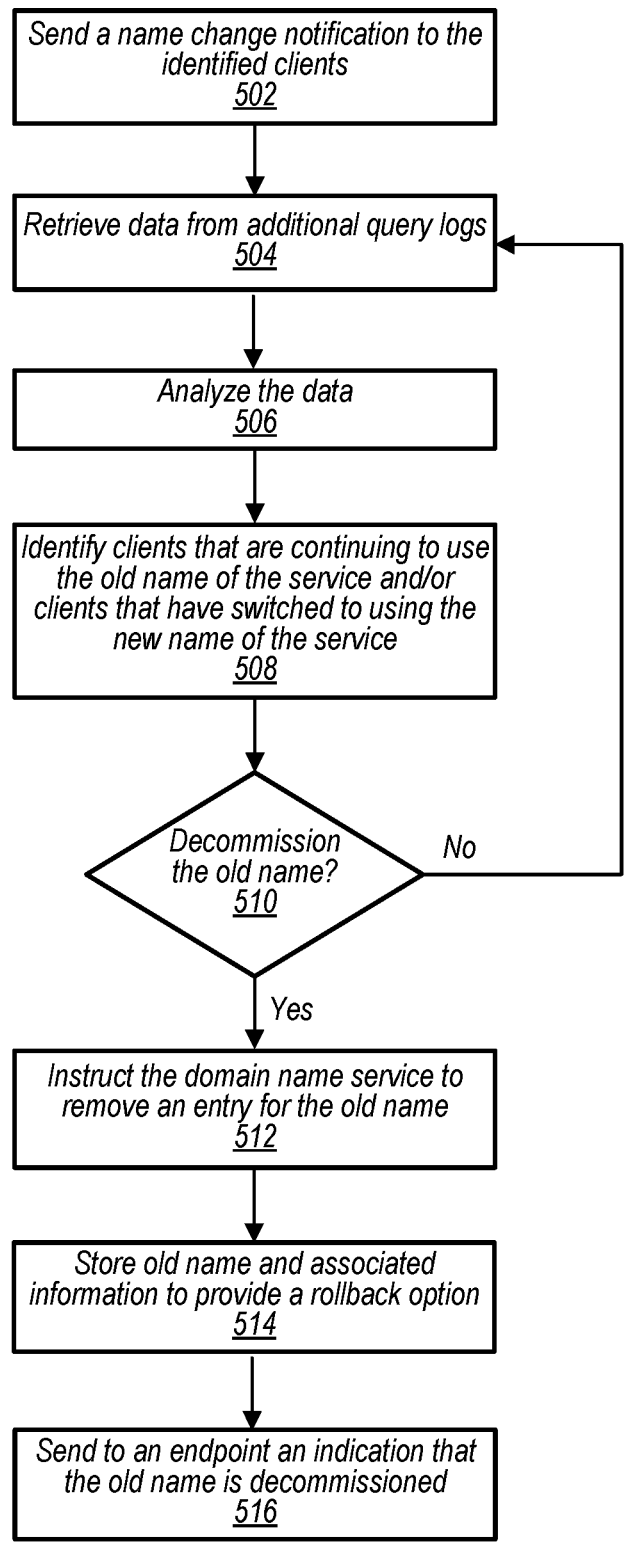
FIG. 5 is a flow diagram illustrating identifying clients that are using the old name or have switched to using the new name and decommissioning the old name, according to some embodiments.

FIG. 5 is a flow diagram illustrating identifying clients that are using the old name or have switched to using the new name and decommissioning the old name, according to some embodiments. At block 502, the renaming tool sends a name change notification to identified clients.

At block 504, the renaming tool retrieves additional data from one or more additional query logs. In embodiments, the renaming tool may wait for a predetermined amount of time before retrieving the additional data. At least some of the additional query logs may include the new name of the service as the queried name. At least some of the additional query logs may include the old name of the service as the queried name. Thus, the renaming tool may retrieve data from any records that include the old name or the new name.

At block 506, the renaming tool analyzes the retrieved data. At block 508, the renaming tool identifies clients that are continuing to use the name of the service (e.g., using the originating client network address of query logs that include the old name) and/or clients that have switched to using the new name of the service (e.g., using the originating client network address of query logs that include the old name).

At block 510, the renaming tool determines whether to decommission the old name of the service. In embodiments, the renaming tool may determine whether a number of the clients (or DNS queries) that are continuing to use the old name of the service is below a threshold number (or whether a percentage of those clients (or DNS queries) is below a threshold percentage of all of the clients using the service (or all DNS queries for the service) or whether a ratio of those clients (or DNS queries) to all of the clients (or all DNS queries for the service) is below a threshold ratio). If so, the renaming tool may proceed to block 512 and instruct the DNS to delete the entry for the old name. If not, the process may return to block 504. In embodiments, any number of rules or criteria may be used to determine whether a small enough number of clients is still using the old name so that the renaming tool proceeds to block 512.

In some embodiments, at block 510, the renaming manger may determine whether a number of the clients (or DNS queries) that have switched to using the new name of the service exceeds a threshold number (or whether a percentage of those clients (or DNS queries) is above a threshold percentage of all of the clients using the service (or all DNS queries for the service) or whether a ratio of those clients (or DNS queries) to all of the clients (or all DNS queries for the service) is above a threshold ratio). If so, the renaming tool may proceed to block 512 and instruct the DNS to delete the entry for the old name. If not, the process may return to block 504.

In embodiments, at block 510, the renaming tool may determine whether one or more particular clients (e.g., a "whitelist" of clients) have switched to using the new name. For example, a user may send, to the renaming manger, a list of IP addresses (or one or more range of IP addresses) and/or other client-identifying information for the whitelisted clients. The renaming manger may determine whether all of the whitelisted clients have switched to using the new name based on the analysis of the retrieved data for the query logs. If so, the renaming tool may proceed to block 512 and instruct the DNS to delete the entry for the old name. If not, the process may return to block 504.

In embodiments, any number of rules or criteria may be used to determine whether a sufficient amount of the clients has switched to using the new name so that the renaming tool proceeds to block 512. At block 514, the renaming tool stores the old name and some or all of the entry for the old name to provide a rollback option (as discussed above). At block 516, the renaming tool sends to the endpoint (e.g., management device) an indication that the old name is decommissioned.

Figure 6:
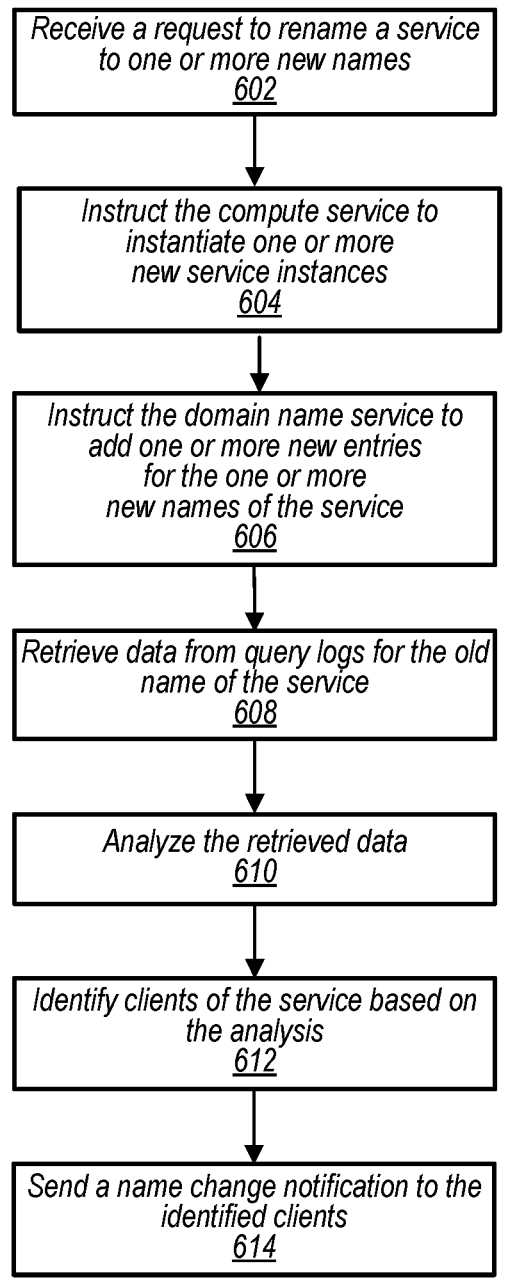
FIG. 6 is a flow diagram illustrating instantiating services instances for a service, identifying clients of the service, and sending a name change notification to the identified clients, according to some embodiments.

FIG. 6 is a flow diagram illustrating instantiating services instances for a service, identifying clients of the service, and sending a name change notification to the identified clients, according to some embodiments. At block 602, the renaming tool receives a request to rename a service to one or more new names (e.g., renaming oldname.foo.com to newname.foo.com, or renaming name.foo.com to east.foo.com and west.foo.com).

At block 604, the renaming tool instructs the compute service to instantiate one or more new service instances corresponding to the one or more new names. At block 606, the renaming tool instructs the DNS to add one or more new entries for the one or more new names of the service. In embodiments, each of the entries may include a different network address.

At block 608, the renaming tool retrieves data from query logs for the old name of the service. At block 610, the renaming tool analyzes the retrieved data. At block 612, the renaming tool identifies clients of the service based on the analysis (e.g., as described above). At block 614, the renaming tool sends a name change notification to the identified clients.

Figure 7:
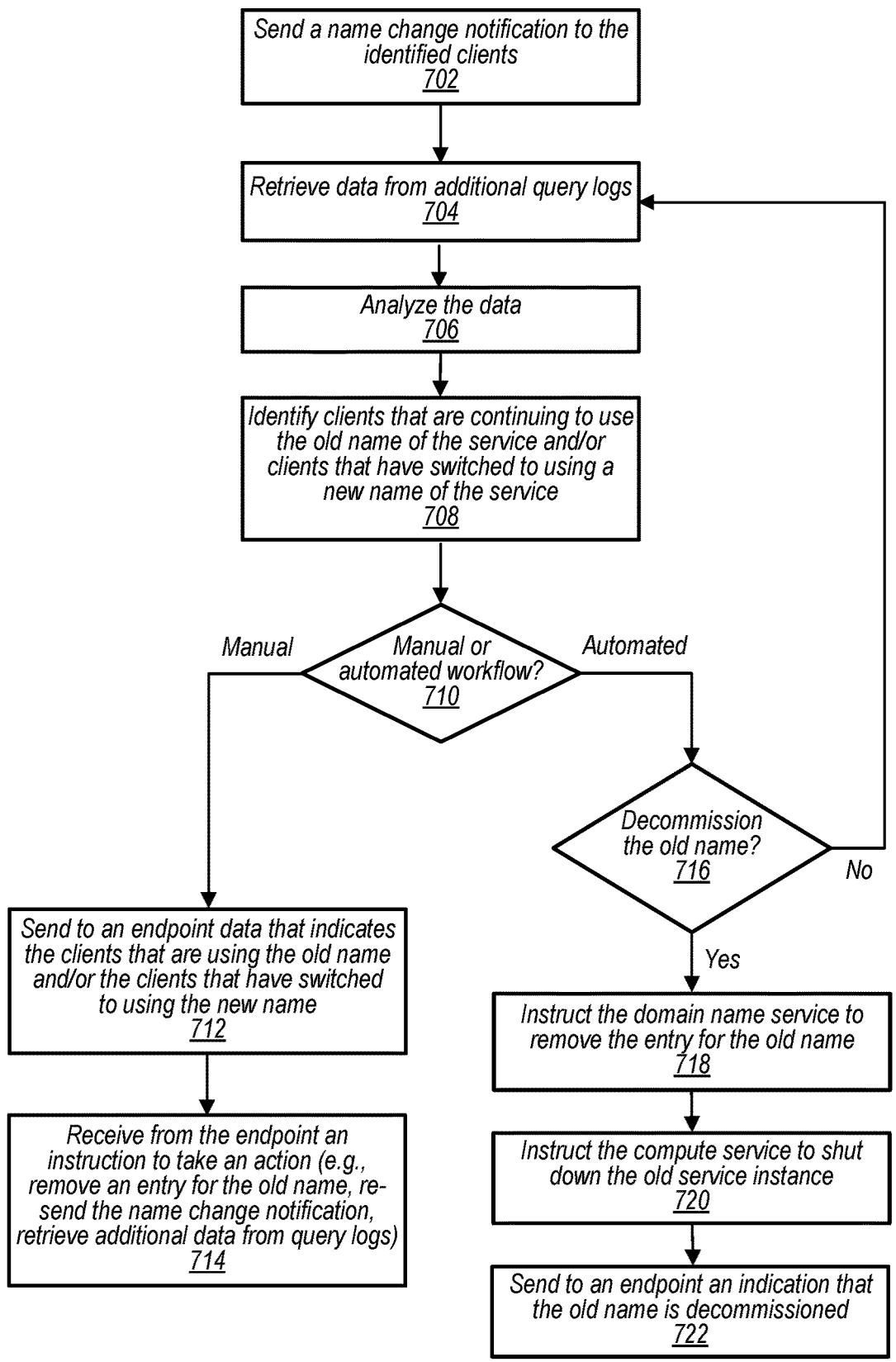
FIG. 7 is a flow diagram illustrating identifying clients that are using the old name or have switched to using the new name and following a manual or automated workflow for taking subsequent actions, according to some embodiments.

FIG. 7 is a flow diagram illustrating identifying clients that are using the old name or have switched to using the new name and following a manual or automated workflow for taking subsequent actions, according to some embodiments. At block 702, the renaming tool sends a name change notification to identified clients.

At block 704, the renaming tool retrieves additional data from one or more additional query logs. In embodiments, the renaming tool may wait for a predetermined amount of time before retrieving the additional data. At least some of the additional query logs may include the new name of the service as the queried name. At least some of the additional query logs may include the old name of the service as the queried name. Thus, the renaming tool may retrieve data from any records that include the old name or the new name.

At block 706, the renaming tool analyzes the retrieved data. At block 708, the renaming tool identifies clients that are continuing to use the name of the service (e.g., using the originating client network address of query logs that include the old name) and/or clients that have switched to using the new name of the service (e.g., using the originating client network address of query logs that include the old name).

At block 710, the renaming tool determines whether to perform the renaming process according to a manual or automated workflow. If the renaming tool determines to perform the renaming process according to a manual workflow, then at block 712, the renaming manger sends to an endpoint (e.g., management device) data that indicates clients that are using the old name and/or clients that have switched to using the new name. In embodiments, the data may include any of the data described above (e.g., for FIG. 4).

At block 712, the renaming tool receives from the endpoint (e.g., management device) a request or instruction to take an action. For example, the request may be to decommission the name of the service and/or to shut down the old service instance corresponding to the old name of the service. If so, then the renaming tool instructs the DNS to delete (or inactive) the entry for the old (e.g., original) name and/or instructs the compute service to shut down the old service instance corresponding to the old name of the service.

Returning to block 710, if the renaming tool determines to perform the renaming process according to an automated workflow, then at block 716, the renaming manger may determine whether to decommission the old name of the service. In embodiments, the renaming manger make the determination as described above (e.g., for FIG. 5). If so, the renaming tool may proceed to block 718 and instruct the DNS to delete the entry for the old name. If not, then the renaming manger may return to block 704.

At block 720, the renaming manger instructs the compute service to shut down the old service instance corresponding to the old name of the service. At block 722, the renaming tool sends to the endpoint an indication that the old name has been decommissioned.

FIG. 8 is a flow diagram illustrating analyzing data based on query logs and following a manual or automated workflow for taking subsequent actions for scaling service instances up or down, according to some embodiments. In embodiments, the renaming tool or any other component of the provider network may perform the various actions described for FIG. 8. At block 802, the renaming tool receives a request (e.g., via a management device and/or management APIs) to set one or more parameters for scaling instances for a service. In some embodiments, at block 802 the renaming tool may instead receive a request to begin the process for scaling instances up or down. The process may then proceed to block 804.

In embodiments, one or more of the services provided by the provider network 100 are provided by multiple service instances that have been instantiated for the service (e.g., as described above). For example, a particular service may have 100 service instances. Thus, even though there may be only one (or more) entry for the name/network address of the service in the DNS, a load balancer (e.g., routing device) at the network address for the service may route any given service request to one or the 100 different instances to service the request.

At block 804, the renaming tool retrieves data from one or more query logs. In embodiments, the renaming tool may retrieve data from query logs or data corresponding to query logs that include the old name of the service. At block 806, the renaming tool analyzes the retrieved data to determine one or more metrics for the service instances (e.g., number of requests, number of errors associated with requests). In embodiments, the analysis may include determining a number of requests made to the service during a particular time period (e.g., defined by a user) and/or number of errors associated with requests during a particular time period (e.g., defined by a user). For example, the renaming tool may determine how many requests were made by one or more client devices to the service during the last 24 hours or during another 24 hour time period that occurred in the past.

At block 808, the renaming tool determines whether to perform the scaling process according to a manual or automated workflow (e.g., based on a setting provided by the user). If the renaming tool determines to perform the scaling process according to a manual workflow, then at block 810, the renaming manger sends to an endpoint (e.g., management device) data indicating the one or more metrics.

At block 812, the renaming tool receives from the endpoint (e.g., management device) a request or instruction to take an action. For example, the request may be to scale up the service by instantiating one or more new service instances for the service. If so, then the renaming tool instructs the compute service to instantiate one or more new service instances for the service in order to provide more instances to service requests from clients (e.g., instantiate 10 new instances so that 110 instances are running). The request may be to scale down the service by shutting down one or more existing service instances for the service. If so, then the renaming tool instructs the compute service to shut down one or more service instances for the service in order to reduce the number of instances to service requests from clients (e.g., shut down 10 instances so that 90 instances are running). In embodiments, the request may be to not take any scaling action. In embodiments, the renaming manger does not perform any scaling if no request is received from the endpoint.

Returning to block 808, if the renaming tool determines to perform the scaling process according to an automated workflow, then at block 814, the renaming manger may determine whether to scale the service and if so, whether to scale up or down. In embodiments, the renaming tool uses one or more rules (e.g., provided by the user) to determine whether to scale up or down.

For example, if the number of requests made to the service during a particular time period and/or number of errors associated with requests during a particular time period exceeds a threshold number (e.g., one or the parameters received at step 802), then the renaming tool may determine to scale up the service by instructing the compute service to instantiate one or more service instances at block 816. If the number of requests made to the service during a particular time period and/or number of errors associated with requests during a particular time period is below a threshold number (e.g., one or the parameters received at step 802), then the renaming tool may determine to scale down the service by instructing the compute service to shut down one or more service instances at block 816. At block 818, the renaming tool sends to an endpoint (e.g., management device) an indication of the number of current service instances that are running.

If the renaming tool determines not to scale the service, then the renaming manger may return to block 804 to retrieve additional data from the query logs. The renaming tool may determine not to scale the service if the number of requests made to the service during a particular time period and/or number of errors associated with requests during a particular time period is below a particular threshold number and/or above another particular threshold number (e.g., parameters received at step 802). For example, if the number of request made to the service during a 24 hour period is below 100,000 and above 50,000, then the renaming tool may determine not to scale the service. In embodiments, the renaming service may wait for a threshold period of time to retrieve additional data at block 804 before proceeding again to analyze the data at block 806.

FIG. 9 illustrates an example display of data indicating queries made for an old service versus a new service. The example graph 900 may be displayed on a graphical user interface of a management device. The graph 900 may show usage of the old name of a service versus the new name of the service after the renaming tool sends a name change notification to clients of the service.

The example graph shows that the number of DNS queries for the old name of a service goes down over time and the number of DNS queries for the new name of the service goes up over time. In some embodiments, the queries for the old name eventually go to zero or below a threshold number, at which point a user may request that the old name be decommissioned and/or deleted from the DNS service.

Figure 10:
FIG. 10 illustrates an example display of data indicating queries made for an old service by different clients of the service.

FIG. 10 illustrates an example display of data indicating queries made for an old service by different clients of the service. The example table 1000 may be displayed on a graphical user interface of a management device. The table 1000 may show the clients of the service that have been making the most calls to the old name of the service (e.g., after the renaming tool sends out the name change notification to clients of the service).

The example graph identifies top five clients that are still making requests for the old name. In some embodiments, any other number of top clients may be shown, in descending or ascending order. When the number of queries of the top clients is low enough or for any other reasons based on the table, a user may request that the old name be decommissioned and/or deleted from the DNS service.

Figure 11:
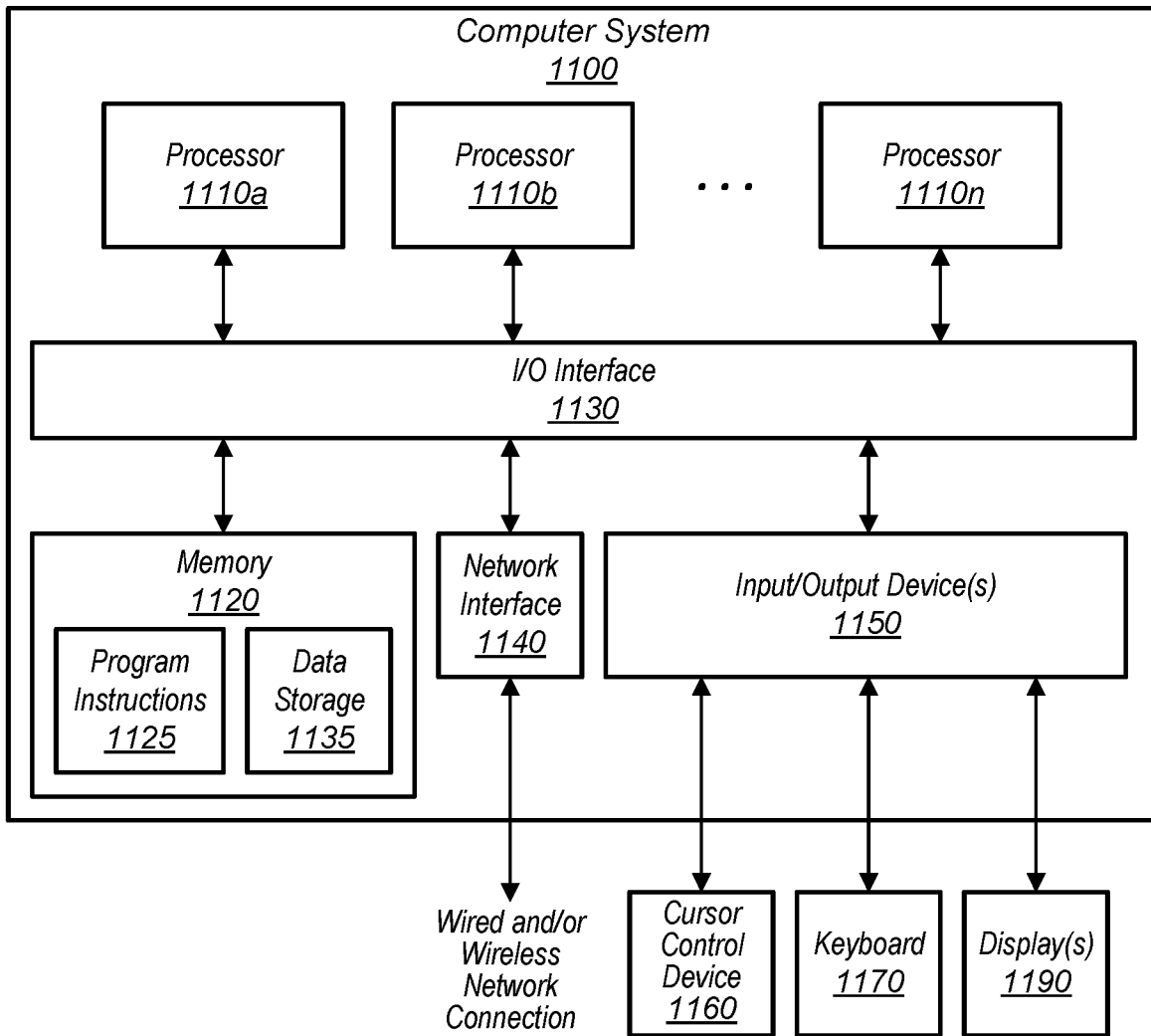
FIG. 11 is a block diagram illustrating an example computer system that implements some or all of the techniques described herein, according to some embodiments.

Any of various computer systems may be configured to implement processes associated with service discovery and renaming. For example, FIG. 11 is a block diagram illustrating one embodiment of a computer system suitable for implementing at least some of the systems and methods described herein. In various embodiments, the clients, management device, computing devices that implement services of the provider network 100 or other networks, and/or any other described components may each include one or more computer systems 1100 such as that illustrated in FIG. 11 or one or more components of the computer system 1200 that function in a same or similar way as described for the computer system 1200.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or downloadable application, while in other embodiments servers may include more, fewer, or different elements than computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be embedded processors implementing any of a variety of instruction set architectures (ISAs), such as the x106, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the provider network, clients, and management device, are shown stored within system memory 1120 as program instructions 1125. In some embodiments, system memory 1120 may include data 1135 which may be configured as described herein.

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as between the clients, the provider network, and other computer systems, for example. In particular, network interface 1140 may be configured to allow communication between computer system 1100 and/or various I/O devices 1150. I/O devices 1150 may include scanning devices, display devices, input devices and/or other communication devices, as described herein. Network interface 1140 may commonly support one or more wireless networking protocols (e.g., Wi-Fi/IEEE 802.7, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1100 via I/O interface 1130. A computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In some embodiments, I/O devices 1150 may be relatively simple or "thin" client devices. For example, I/O devices 1150 may be configured as dumb terminals with display, data entry and communications capabilities, but otherwise little computational functionality. However, in some embodiments, I/O devices 1150 may be computer systems configured similarly to computer system 1100, including one or more processors 1110 and various other devices (though in some embodiments, a computer system 1100 implementing an I/O device 1150 may have somewhat different devices, or different classes of devices).

In various embodiments, I/O devices 1150 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1150 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1100. In general, an I/O device 1150 (e.g., cursor control device, keyboard, or display(s) may be any device that can communicate with elements of computing system 1100.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the provider network, clients, management devices, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices of a provider network comprising respective processors and memory to implement:
a domain name service to:
receive queries for respective names; and
send query logs for the queries to a data store, wherein individual ones of the query logs indicate at least the queried name; and
a service discovery and renaming tool to:
for individual ones of one or more services, the individual ones of the services having a respective name and network address:
instruct the domain name service to add a new entry, wherein the new entry indicates at least another name of the service;
subsequent to addition, by the domain name service, of the new entry for the other name of the service, retrieve data from one or more of the query logs, wherein the one or more query logs respectively indicate the name of the service as the queried name and an originating client network address of a client of the service that used the queried name;
analyze the retrieved data;
identify, based on the analysis of the retrieved data that includes the originating client network address of clients of the service that used the queried name, a plurality of different clients of the service that have continued to use the name of the service after the addition of the new entry for the other name of the service; and
in response to the identification of the plurality of different clients of the service that have continued to use the name of the service after the addition of the new entry for the other name of the service, send to an endpoint an indication of the plurality of different clients of the service that have continued to use the name of the service after the addition of the new entry for the other name of the service.

2. The system as recited in claim 1, wherein, subsequent to the sending of the indication, the one or more computing devices further implement:
the domain name service to:
receive additional queries for respective names; and
store additional query logs for the queries to the data store, wherein individual ones of the additional query logs indicate at least the respective queried name; and
the service discovery and renaming tool to:
retrieve additional data from one or more of the additional query logs, wherein at least a portion of the one or more additional query logs indicate the other name of the service as the respective queried name;
analyze the retrieved additional data; and
identify, based on the analysis of the retrieved additional data, one or more of:
clients that are continuing to use the name of the service, or
clients that have switched to using the other name of the service.

3. The system as recited in claim 2, wherein the one or more computing devices further implement the service discovery and renaming tool to:
send to a management device data indicating one or more of:
one or more of the clients that are continuing to use the name,
a number of queries for the name,
a number of queries for the name that originated from the respective one or more of the clients that are continuing to use the name,
one or more of the clients that have switched to using the other name,
a number of queries for the other name, or
a number of queries for the other name that originated from the respective one or more of the clients that have switched to using the other name;
receiving from the management device a request to decommission the name of the service; and
instruct the domain name service to delete an entry that comprises the name of the service.

4. The system as recited in claim 2, wherein the one or more computing devices further implement the service discovery and renaming tool to:
determine that a number of the clients that are continuing to use the name of the service is below a threshold number or that a number of the clients that have switched to using the other name of the service exceeds a threshold number;
instruct the domain name service to delete an entry that comprises the name of the service; and
instruct a compute service to shut down one or more instances corresponding to the service.

5. The system as recited in claim 1, wherein to retrieve data from one or more of the query logs, the one or more computing devices further implement the service discovery and renaming tool to:
   determine that each of the one or more query logs comprises a queried name that matches the name of the service; and
   retrieve data from the one or more query logs, wherein data from individual ones of the one or more query logs indicates one or more of a portion of a network address of a client that originally submitted a request comprising the queried name or a timestamp of when the query was received.

6. A method, comprising:
   performing, by one or more computing devices of a provider network:
   for individual ones of one or more services, the individual ones of the services having a respective name and network address:
      instructing a domain name service to add a new entry, wherein the new entry indicates at least another name of the service;
      subsequent to addition, by the domain name service, of the new entry for the other name of the service, retrieving data from one or more query logs generated by the domain name service, wherein the one or more query logs respectively indicate the name of the service as a queried name and an originating client network address of a client of the service that used the queried name;
      analyzing the retrieved data;
      identifying, based on the analysis of the retrieved data that includes the originating client network address of clients of the service that used the queried name, a plurality of different clients of the service that have continued to use the name of the service after the addition of the new entry for the other name of the service; and
      in response to the identification of the plurality of different clients of the service that have continued to use the name of the service after the addition of the new entry for the other name of the service, sending to an endpoint an indication of the plurality of different clients of the service that have continued to use the name of the service after the addition of the new entry for the other name of the service.

7. The method as recited in claim 6, further comprising:
   subsequent to the sending of the indication:
   retrieving additional data from one or more additional query logs, wherein at least a portion of the one or more additional query logs respectively indicate the other name of the service as a respective queried name;
   analyzing the retrieved additional data; and
   identifying, based on the analysis of the retrieved additional data, one or more of:
      clients that are continuing to use the name of the service, or
      clients that have switched to using the other name of the service.

8. The method as recited in claim 7, further comprising:
   sending to a management device data indicating one or more of:
      one or more of the clients that are continuing to use the name,
      a number of queries for the name,
      a number of queries for the name that originated from the respective one or more of the clients that are continuing to use the name,
      one or more of the clients that have switched to using the other name,
      a number of queries for the other name, or
      a number of queries for the other name that originated from the respective one or more of the clients that have switched to using the other name; and
   receiving from the management device a request to continue analyzing data from query logs to identify additional clients that are continuing to use the name of the service or that have switched to using the other name of the service.

9. The method as recited in claim 7, further comprising:
   sending to a management device data indicating one or more of:
      one or more of the clients that are continuing to use the name,
      a number of queries for the name,
      a number of queries for the name that originated from the respective one or more of the clients that are continuing to use the name,
      one or more of the clients that have switched to using the other name,
      a number of queries for the other name, or
      a number of queries for the other name that originated from the respective one or more of the clients that have switched to using the other name;
   receiving from the management device a request to decommission the name of the service; and
   instructing the domain name service to delete an entry that comprises the name of the service.

10. The method as recited in claim 7, further comprising:
    instructing a compute service to instantiate a new service instance for the service;
    assigning the other name of the service to the new service instance; and
    assigning another network address to the new service instance.

11. The method as recited in claim 10, further comprising:
    determining that a number of the clients that are continuing to use the name of the service is below a threshold number or that a number of the clients that have switched to using the other name of the service exceeds a threshold number;
    instructing the domain name service to delete an entry that comprises the name of the service; and
    instructing the compute service to shut down a service instance assigned to the name.

12. The method as recited in claim 6, further comprising:
    instructing the domain name service to add one or more additional new entries, wherein the one or more additional new entries indicate respective names of the service;
    instructing one or more compute services at respective locations to instantiate a new service instance for the service;
    assigning the respective names of the service to the new service instances; and
    assigning different network addresses to the respective new service instances.

13. The method as recited in claim 6, wherein the name of the service is assigned to a service instance of a compute service that is configured to execute a version of code, and further comprising:
    sending to the compute service a different version of code;

instructing the compute service to instantiate a new service instance configured to execute the different version of code; and assigning the other name of the service to the new service instance.

14. A non-transitory computer-readable storage medium storing program instructions that, when executed by one or more computing devices for a service of a network, cause the one or more computing devices to implement:

for individual ones of one or more services, the individual ones of the services having a respective name and network address:

instructing a domain name service to add a new entry, wherein the new entry indicates at least another name of the service;

subsequent to addition, by the domain name service, of the new entry for the other name of the service, retrieving data from one or more query logs generated by the domain name service, wherein the one or more query logs respectively indicate the name of the service as a queried name and an originating client network address of a client of the service that used the queried name;

analyzing the retrieved data;

identifying, based on the analysis of the retrieved data that includes the originating client network address of clients of the service that used the queried name, a plurality of different clients of the service that have continued to use the name of the service after the addition of the new entry for the other name of the service; and in response to the identification of the plurality of different clients of the service that have continued to use the name of the service after the addition of the new entry for the other name of the service, sending to an endpoint an indication of the plurality of different clients of the service that have continued to use the name of the service after the addition of the new entry for the other name of the service.

15. The computer-readable storage medium as recited in claim 14, wherein the program instructions cause the one or more computing devices to implement:

subsequent to the sending of the indication:

retrieving additional data from one or more additional query logs, wherein at least a portion of the one or more additional query logs respectively indicate the other name of the service as a respective queried name;

analyzing the retrieved additional data; and identifying, based on the analysis of the retrieved additional data, one or more of:

clients that are continuing to use the name of the service, or clients that have switched to using the other name of the service.

16. The computer-readable storage medium as recited in claim 15, wherein the program instructions cause the one or more computing devices to implement:

sending to a management device data indicating one or more of:

one or more of the clients that are continuing to use the name, a number of queries for the name, a number of queries for the name that originated from the respective one or more of the clients that are continuing to use the name, one or more of the clients that have switched to using the other name, a number of queries for the other name, or a number of queries for the other name that originated from the respective one or more of the clients that have switched to using the other name;

receiving from the management device a request to decommission the name of the service; and instructing the domain name service to delete an entry that comprises the name of the service.

17. The computer-readable storage medium as recited in claim 15, wherein the program instructions cause the one or more computing devices to implement:

instructing a compute service to instantiate a new service instance for the service;

assigning the other name of the service to the new service instance; and assigning another network address to the new service instance.

18. The computer-readable storage medium as recited in claim 17, wherein the name of the service is assigned to a service instance of a compute service that is configured to execute a version of code, and wherein the program instructions cause the one or more computing devices to implement:

sending to the compute service a different version of code;

instructing the compute service to instantiate a new service instance configured to execute the different version of code; and assigning the other name of the service to the new service instance.

19. The computer-readable storage medium as recited in claim 17, wherein the program instructions cause the one or more computing devices to implement:

determining that a number of the clients that are continuing to use the name of the service is below a threshold number or that a number of the clients that have switched to using the other name of the service exceeds a threshold number;

instructing the domain name service to delete an entry that comprises the name of the service; and instructing the compute service to shut down a service instance assigned to the name.

20. The computer-readable storage medium as recited in claim 14, wherein the program instructions cause the one or more computing devices to implement:

instructing the domain name service to add one or more additional new entries, wherein the one or more additional new entries indicate respective names of the service;

instructing one or more compute services at respective locations to instantiate a new service instance for the service;

assigning the respective names of the service to the new service instances; and assigning different network addresses to the respective new service instances.

* * * * *